US008090987B2

(12) United States Patent
Lee et al.

(10) Patent No.: US 8,090,987 B2
(45) Date of Patent: Jan. 3, 2012

(54) IMAGING APPARATUS HAVING AUTOMATIC BACKUP FUNCTION AND METHOD FOR CONTROLLING THE SAME

(75) Inventors: Dong Joon Lee, Seoul (KR); Kwan Seung Baek, Gumi-si (KR)

(73) Assignee: LG Electronics Inc., Seoul (KR)

( * ) Notice: Subject to any disclaimer, the term of this patent is extended or adjusted under 35 U.S.C. 154(b) by 483 days.

(21) Appl. No.: 11/386,704

(22) Filed: Mar. 23, 2006

(65) Prior Publication Data
US 2007/0174675 A1    Jul. 26, 2007

(30) Foreign Application Priority Data

Dec. 5, 2005  (KR) .......................... 10-2005-0117510
Dec. 5, 2005  (KR) .......................... 10-2005-0117511

(51) Int. Cl.
*G06F 11/00* (2006.01)
*G06F 11/20* (2006.01)
(52) U.S. Cl. ................ 714/22; 714/7; 714/6.2; 714/6.3; 714/6.1; 386/292; 386/295
(58) Field of Classification Search ................. 714/6, 7, 714/22, 2, 6.1, 6.2, 6.3; 386/46, 56, 64, 45, 386/294, 295, 228; 725/34
See application file for complete search history.

(56) References Cited

U.S. PATENT DOCUMENTS

| | | | | |
|---|---|---|---|---|
| 5,195,100 A | * | 3/1993 | Katz et al. ...................... | 714/22 |
| 6,144,992 A | * | 11/2000 | Turpin et al. ................... | 709/208 |
| 6,311,011 B1 | * | 10/2001 | Kuroda ........................ | 386/297 |
| 6,349,373 B2 | * | 2/2002 | Sitka et al. ..................... | 711/161 |
| 6,662,281 B2 | * | 12/2003 | Ballard et al. ................. | 711/162 |
| 6,678,463 B1 | * | 1/2004 | Pierre et al. ................... | 386/291 |
| 6,714,719 B1 | * | 3/2004 | Okumura ...................... | 386/234 |
| 6,904,541 B1 | * | 6/2005 | MacArthur et al. ............ | 714/14 |
| 6,920,281 B1 | * | 7/2005 | Agnibotri et al. ............. | 386/125 |
| 7,039,778 B2 | * | 5/2006 | Yamasaki ..................... | 711/162 |
| 7,239,796 B2 | * | 7/2007 | Goto et al. .................... | 386/293 |

(Continued)

FOREIGN PATENT DOCUMENTS

CN    1523597    8/2004

(Continued)

OTHER PUBLICATIONS

Method and Apparatus for Improving Fault Tolerance of Multi-media Document Management Systems European Patent Application Publication 0 614 141 A2 Applicant: International Business Machines Corporation Inventor: Manthuruthil and Reddy.*

(Continued)

*Primary Examiner* — Joseph Schell
(74) *Attorney, Agent, or Firm* — KED & Associates LLP (57) ABSTRACT

An imaging apparatus having an automatic backup function and a method for controlling the same are disclosed which can more securely store particular data, considered to be important by the user, in a memory of the imaging apparatus, and can automatically read out the particular data. The imaging apparatus includes a tuner which receives data containing at least one of audio data and video data, a main storage unit which stores data containing at least one of audio data and video data, and a controller which determines backup data, to be stored in a backup storage unit, from the data stored in the main storage unit, copies data determined as the backup data, and stores the copied data in the backup storage unit, whereby the imaging apparatus has an automatic data backup function.

20 Claims, 5 Drawing Sheets

U.S. PATENT DOCUMENTS

| | | | |
|---|---|---|---|
| 7,242,849 B2 * | 7/2007 | Okada | 386/293 |
| 7,392,429 B2 * | 6/2008 | Frank et al. | 714/24 |
| 7,437,053 B2 * | 10/2008 | Ishibashi | 386/263 |
| 7,512,673 B2 * | 3/2009 | Miloushev et al. | 709/221 |
| 7,707,603 B2 * | 4/2010 | Abanami | 725/34 |
| 2002/0047925 A1 | 4/2002 | Choi | |
| 2002/0065999 A1 * | 5/2002 | Kikuchi et al. | 711/162 |
| 2002/0106197 A1 * | 8/2002 | Boyle | 386/111 |
| 2002/0131189 A1 | 9/2002 | Kamio | |
| 2003/0172317 A1 * | 9/2003 | Tsunoda et al. | 714/7 |
| 2004/0148547 A1 * | 7/2004 | Thompson et al. | 714/22 |
| 2004/0161226 A1 * | 8/2004 | Watson | 386/125 |
| 2004/0223727 A1 * | 11/2004 | Ohnishi | 386/46 |
| 2004/0228607 A1 * | 11/2004 | Tsutsumitake et al. | 386/46 |
| 2004/0255181 A1 * | 12/2004 | Hsu et al. | 714/2 |
| 2004/0260966 A1 * | 12/2004 | Kaiya et al. | 714/2 |
| 2004/0268389 A1 * | 12/2004 | Sezan et al. | 725/35 |
| 2005/0027753 A1 * | 2/2005 | Akama et al. | 707/200 |
| 2005/0152669 A1 | 7/2005 | Kim et al. | |
| 2005/0160308 A1 | 7/2005 | Elcock et al. | |
| 2005/0210080 A1 * | 9/2005 | Saika | 707/204 |
| 2005/0216944 A1 | 9/2005 | Johnson | |
| 2005/0259965 A1 | 11/2005 | Ishito | |
| 2006/0053334 A1 * | 3/2006 | Ingen et al. | 714/2 |
| 2006/0085817 A1 * | 4/2006 | Kim et al. | 725/34 |

FOREIGN PATENT DOCUMENTS

| | | |
|---|---|---|
| CN | 1527308 | 9/2004 |
| CN | 1624684 | 6/2005 |
| EP | 1 431 979 A1 | 6/2004 |
| EP | 1 439 541 A1 | 7/2004 |
| JP | 2002-281436 | 9/2002 |
| KR | 10-2004-0016032 A | 2/2004 |

OTHER PUBLICATIONS

Chinese Office Action dated Nov. 7, 2008 (Full Chinese text and full English translation).
Office Action dated Aug. 25, 2010.
European Search Report dated Apr. 21, 2011.

* cited by examiner

IMAGING APPARATUS HAVING AUTOMATIC BACKUP FUNCTION AND METHOD FOR CONTROLLING THE SAME

This application claims the benefit of Korean Patent Applications No. 10-2005-00117510, filed on Dec. 5, 2005 and No. 10-2005-00117511, filed on Dec. 5, 2005, which is hereby incorporated by reference as if fully set forth herein.

BACKGROUND OF THE INVENTION

1. Field of the Invention

The present invention relates to an imaging apparatus and a method for controlling the same, and more particularly, to an imaging apparatus having an automatic backup function and a method for controlling the same which can store important data in a backup storage unit in accordance with a user's selection or in an automatic manner, to cope with unexpected memory failure, thereby being capable of achieving an enhancement in the convenience of the user, considerably reducing the possibility of loss of data, and normally performing a data storing task even when there is a problem such as failure of power supply to a main storage unit or an insufficient memory capacity of the main storage unit.

2. Discussion of the Related Art

Recently-developed imaging apparatuses have a variety of functions in pace with the current multimedia age.

In particular, such an imaging apparatus not only has a function for simply outputting particular data in real time, but also has a function for storing audio and video data desired by the user, and subsequently reproducing the audio and video data at the point of time when the user desires to hear and view the audio and video data.

For example, such an imaging apparatus may be a personal video recorder (PVR).

The PVR is an apparatus which can record digital broadcast data in a storage unit such as a hard disk drive (HDD). The PVR provides functions considerably improved over those of conventional video cassette recorders (VCRs). For example, the PVR not only provides a general recording function, but also provides a time shift function, an instant replay function that can be performed during viewing of live broadcast, and other various play functions.

Furthermore, the PVR provides advantages in that it can provide various additional services such as a function for recording high-quality digital broadcast data of a high-definition (HD) grade in a memory, and reproducing the recorded data when the user desires to view the data, and a function for storing an image taken by the user with a camera in the memory, and displaying the stored image on a screen when the user desires to view the image.

Meanwhile, the current tendency of such a PVR is not to independently use the PVR, but to incorporate the PVR in an HD set top box or a TV set. Recently-developed PVRs can freely record and play back digital broadcast data.

In addition, such a PVR can store, in a memory space thereof (for example, an HDD) audio/video (A/V), data input from an external device as well as input broadcast signals (for example, digital broadcast signals or analog broadcast signals), and can play back the stored data or signals.

In particular, the recently-developed PVRs have an electronic photo frame function for storing, in a memory, photograph images taken during a trip or in a celebration or condolence, and displaying the stored photograph images.

In accordance with the recent fast development of storage techniques, the capacity of HDDs equipped in PVRs has also been greatly increased. As a result, the quantity of broadcast program data continuously recordable by such a PVR is also greatly increased.

Of course, the memory space of the PVR is still limiting and unstable. For this reason, a technique enabling the memory space of the PVR to be efficiently used is in great demand.

Conventionally, pieces of data stored in an imaging apparatus such as a PVR are collectively managed. For this reason, there is a problem in that, when unexpected impact is applied to the imaging apparatus, most data stored in the imaging apparatus may be damaged.

In particular, the unexpected impact may be an external impact or vibration applied to the imaging apparatus. High voltage electric surges may also be applied to the imaging apparatus. In this case, supply of electric power to the imaging apparatus may be non-uniform.

Moreover, the conventional imaging apparatus has no function for automatically determining particular data to be more securely stored in a memory equipped in the imaging apparatus.

In addition, the conventional imaging apparatus has a problem in that, when unstable supply of power or shortage of memory space occur in the main storage unit of the imaging apparatus, it is impossible to store desired data in the imaging apparatus.

SUMMARY OF THE INVENTION

Accordingly, the present invention is directed to an imaging apparatus having an automatic backup function and a method for controlling the same that substantially obviate one or more problems due to limitations and disadvantages of the related art.

An object of the present invention is to provide an imaging apparatus having an automatic backup function and a method for controlling the same which can securely protect particular data stored in a memory of the imaging apparatus in spite of unexpected impact applied to the imaging apparatus.

Another object of the invention is to provide an imaging apparatus having an automatic backup function and a method for controlling the same which can automatically determine important data, to be more securely protected, without using a particular input signal entered by the user.

Another object of the invention is to provide an imaging apparatus having an automatic backup function and a method for controlling the same which can normally store desired data in the imaging apparatus even when unstable supply of power or shortage of memory space occur in a main storage unit of the imaging apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling an imaging apparatus comprises the steps of: (a) storing data containing at least one of audio data and video data in a main storage unit or in an auxiliary storage unit; (b) determining backup data, to be stored in a backup storage unit, from the data stored in the main storage unit; (c) supplying drive power to the backup storage unit; and (d) copying the data determined as the backup data, and storing the copied data in the backup storage unit.

In another aspect of the present invention, a method for controlling an imaging apparatus including storage units, comprises the steps of: determining whether or not an error in a recording function of a main one of the storage units has occurred; and storing data, which contains at least one of audio data and video data, in an auxiliary one of the storage units when it is determined that an error in the recording function of the main storage unit has occurred.

In another aspect of the present invention, a method for controlling an imaging apparatus including storage units, comprises the steps of: determining whether or not a main one of the storage units has a memory space capable of sufficiently storing data containing at least one of audio data and video data; and storing the data, which contains at least one of audio data and video data, in an auxiliary one of the storage units when it is determined that the main storage unit does not has the memory space.

In another aspect of the present invention, an imaging apparatus comprises: a tuner which receives data containing at least one of audio data and video data; a main storage unit which stores data containing at least one of audio data and video data; and a controller which determines backup data, to be stored in a backup storage unit, from the data stored in the main storage unit, copies data determined as the backup data, and stores the copied data in the backup storage unit, whereby the imaging apparatus has an automatic data backup function.

In still another aspect of the present invention, an imaging apparatus comprises: a tuner which receives data containing at least one of audio data and video data; a main storage unit which stores data containing at least one of audio data and video data; and a controller which determines whether or not an error in a recording function of the main storage unit has occurred, and stores the data, which contains at least one of audio data and video data, in an auxiliary storage unit when it is determined that an error in the recording function of the main storage unit has occurred, whereby the imaging apparatus has an automatic data backup function.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will how be made in detail to the preferred embodiments of the present invention, examples of which are illustrated in the accompanying drawings. Wherever possible, the same reference numbers will be used throughout the drawings to refer to the same or like parts.

The present invention can back up particular data desired by the user in a separately-added storage unit, and thus, can provide an effect capable of securely storing the particular data.

The present invention can also add, to an imaging apparatus, a function for automatically determining particular data desired by the user, and storing the determined data in a memory, and thus, can provide an effect capable of maximizing the convenience of the user.

In addition, the present invention can provide an effect capable of normally storing desired A/V data even when unexpected errors occur in a main storing unit.

Figure 1:
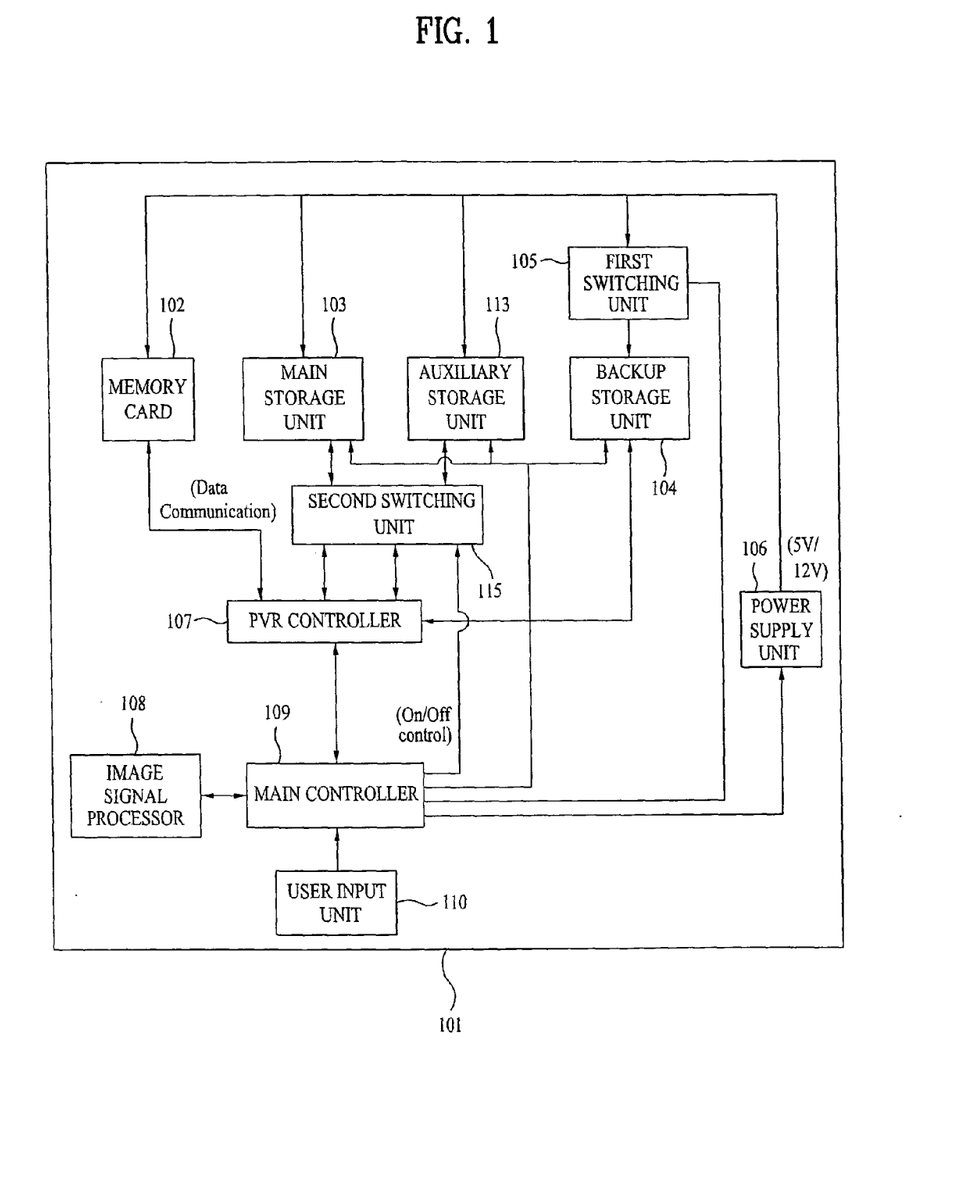
FIG. 1 is a block diagram illustrating an example of the configuration of an imaging apparatus having an automatic backup function according to the present invention.

FIG. 1 is a block diagram illustrating an example of the configuration of an imaging apparatus having an automatic backup function according to the present invention.

Hereinafter, control flows among blocks constituting the imaging apparatus which has an automatic backup function in accordance with the present invention will be described with reference to FIG. 1.

The imaging apparatus according to the present invention, which is designated by reference numeral 101 in FIG. 1, includes a memory card 102, a main storage unit 103, a backup storage unit 104, a first switching unit 105, a power supply unit 106, a PVR controller 107, an image signal processor 108, a main controller 109, a user input unit 110, an auxiliary storage unit 113, and a second switching unit 115.

The imaging apparatus 101 includes a function for storing A/V data or other data in a particular memory, and subsequently reproducing the stored data. For example, the imaging apparatus 101 may be a PVR.

Each of the memory card 102 and main storage unit 103 may be an HDD, in which original A/V data may be stored, or a non-volatile memory.

In particular, the memory card 102 and main storage unit 103 copies A/V data transmitted as broadcast signals or A/V data supplied from an external input device.

Here, the A/V data may mean data including at least one of audio data and video data.

The power supply unit 106 receives commercial AC power, converts the received AC power to DC power, and supplies the DC power to each block of the imaging apparatus 101.

For example, the DC power may have a voltage of 5 V or 12 V. Of course, the values are only illustrative.

In particular, the power supply unit 106 supplies drive power to the memory card 102, main storage unit 103, auxiliary storage unit 113, and backup storage unit 104.

The PVR controller 107 controls the memory card 102, main storage unit 103, auxiliary storage unit 113, and backup storage unit 104, to control tasks such as recording, storage, correction, and deletion of A/V data.

The PVR controller 107 also functions to store data, in the form of transport packets (TPs), in the main storage unit 103, auxiliary storage unit 113, and backup storage unit 104. In order to implement the present invention, the PVR controller 107 may be configured to support at least three channels. In this case, it is preferred that one channel be used for the main storage unit 103, one of the remaining channels be used for the backup storage unit 104, and another one of the remaining channels be used for the auxiliary storage unit 113.

Accordingly, the imaging apparatus 101 can normally operate during a backup operation carried out by the backup storage unit 104. As a result, the backup operation can be implemented through a background task using multiple processes.

The image signal processor 108 receives a broadcast signal at the frequency of a channel selected by the user, demodulates the received broadcast signal, and decodes the broadcast signal demodulated in the form of a transport stream, so as to enable the broadcast signal to be reproduced and stored. The image signal processor 108 also performs a scaling process for the decoded data, in order to enable video data included in the decoded data to be displayed.

Although not shown in FIG. 1, the image signal processor 108 includes an audio signal processor which performs a signal processing operation for the decoded data, in order to output audio data included in the decoded data.

The first switching unit 105 selectively supplies the drive power to the backup storage unit 104 under the control of the main controller 109.

The first switching unit 105 may comprise an FET switch.

The second switching unit 115 functions to selectively supply A/V data sent via the PVR controller 107 to the main storage unit 103 or to the auxiliary storage unit 113 under the control of the main controller 109.

The second switching unit 115 may comprise an FET switch.

Hereinafter, the second switching unit 115 and auxiliary storage unit 113 will be described in detail.

When an error causing impossibility of A/V data recording occurs in the main storage unit 103, the main controller 109 controls the power supply unit 106 to supply drive power to the auxiliary storage unit 113, and then controls the auxiliary storage unit 113 to store the A/V data.

Although not shown, it may be possible to implement a design for supplying the drive power to a selected one of the main storage unit 103 and auxiliary storage unit 113 by connecting the power supply unit 106 to the main storage unit 103 and auxiliary storage unit 113 via a switch.

The error of the main storage unit 103 may be a hardware error in power supply. The auxiliary storage unit 113 may be an HDD, a memory card, or a storage drive compatible with the IEEE 1394 standard.

Where the memory space of the main storage unit 103 is rendered insufficient during recording of particular A/V data, the main controller 109 controls the PVR controller 107 to subsequently record the particular A/V data in the auxiliary storage unit 113.

For example, if the particular A/V data is stored in the auxiliary storage unit 113 before the memory space of the main storage unit 103 is completely used, it is possible to store the particular A/V data without being cut.

The user input unit 110 receives a particular command signal entered by the user, and sends the received command signal to the main controller 109.

The user input unit 110 may include a remote controller or at least one of local keys provided at the imaging apparatus 101.

The main controller 109 collectively controls the image signal processor 108, PVR controller 107, power supply unit 106, first switching unit 105, memory card 102, main storage unit 103, backup storage unit 104, second switching unit 115, and auxiliary storage unit 113.

For example, the main controller 109 performs a control operation to store the image processed by the image signal processor 108 in the memory card 102, main storage unit 103, or backup storage unit 104 via the PVR controller 107, or to output the A/V data stored in the memory card 102, main storage unit 103, or backup storage unit 104 via the image signal processor 108 or audio signal processor (not shown).

In particular, the main controller 109 performs a control operation to back up, in the backup storage unit 104, a copy of the A/V data stored in the main storage unit 103 in accordance with a particular command signal entered by the user via the user input unit 110.

Of course, the main controller 109 may be designed to perform a control operation for automatically backing up a copy of particular A/V data in the backup storage unit 104 even when there is no command signal entered by the user via the user input unit 110.

The method for automatically backing up particular A/V data in the backup storage unit 104 will be later described in detail.

Meanwhile, the main controller 109 may be a central processing unit (CPU) or a micro processing unit (MPU).

The backup storage unit 104 stores a copy of the A/V data stored in the main controller 103, as backup data, under the control of the main controller 109.

Under the control of the main controller 109, no drive power is supplied to the backup storage unit 104 in a normal mode. During a backup task, however, drive power is supplied to the backup storage unit 104 via the first switching unit 105 under the control of the main controller 109.

The main controller 109 may set a reserved time at which the first switching unit 105 and backup storage unit 104 have to operate. Accordingly, it is possible to conveniently back up desired particular data at a desired time.

Figure 2:
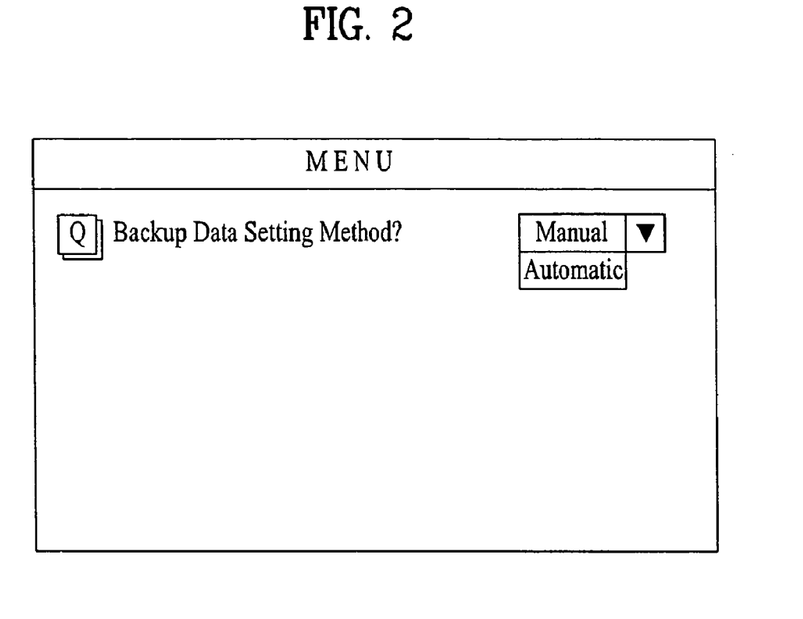
FIG. 2 is a schematic view illustrating a first embodiment of a menu picture displayed on the screen of the imaging apparatus having an automatic backup function.

FIG. 2 is a schematic view illustrating a first embodiment of a menu picture displayed on the screen of the imaging apparatus having an automatic backup function.

Figure 3:
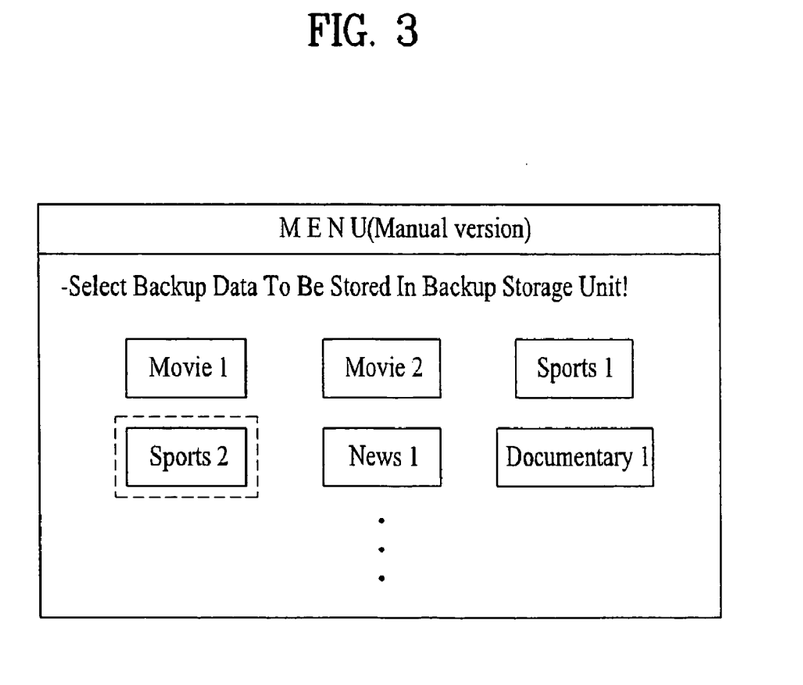
FIG. 3 is a schematic view illustrating a second embodiment of the menu picture displayed on the screen of the imaging apparatus having an automatic backup function.

FIG. 3 is a schematic view illustrating a second embodiment of the menu picture displayed on the screen of the imaging apparatus having an automatic backup function.

Figure 4A:
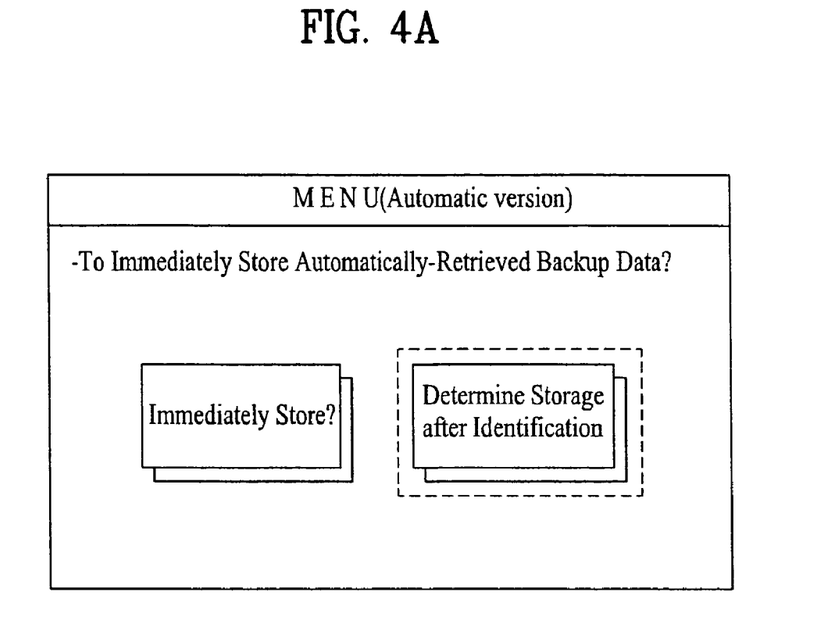
FIG. 4A is a schematic view illustrating a third embodiment of the menu picture displayed on the screen of the imaging apparatus having an automatic backup function.

FIG. 4A is a schematic view illustrating a third embodiment of the menu picture displayed on the screen of the imaging apparatus having an automatic backup function.

Figure 4B:
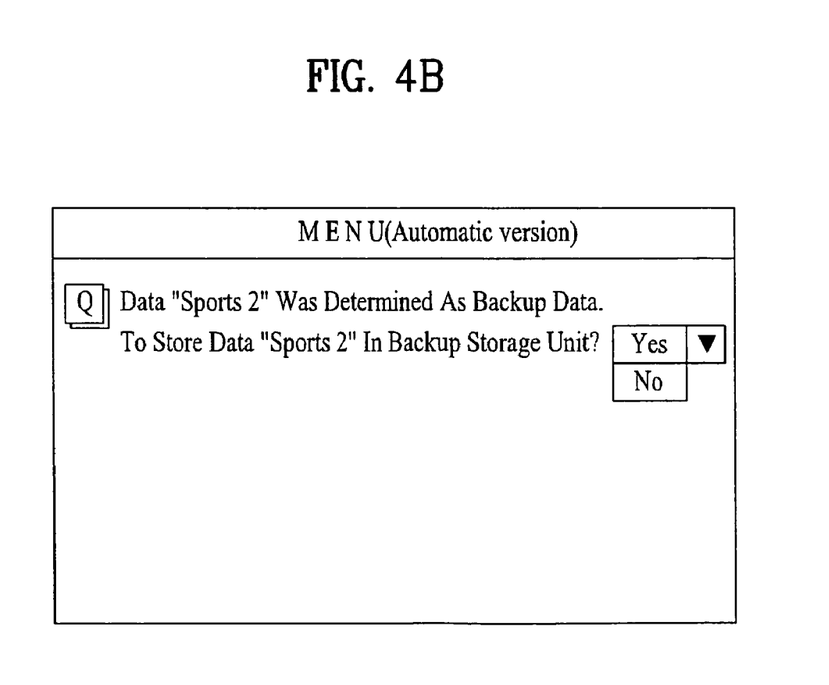
FIG. 4B is a schematic view illustrating a fourth embodiment of the menu picture displayed on the screen of the imaging apparatus having an automatic backup function.

FIG. 4B is a schematic view illustrating a fourth embodiment of the menu picture displayed on the screen of the imaging apparatus having an automatic backup function.

Hereinafter, a method for automatically or manually backing up data to be stored in the backup storage unit, and examples of the menu picture provided to the user of the imaging apparatus will be described with reference to FIGS. 2, 3, 4A, and 4B, together with FIG. 1.

The embodiments of the menu picture according to the present invention shown in FIGS. 2, 3, 4A, and 4B are only illustrative without limiting the protection scope of the present invention thereto.

One aspect of the present invention is to greatly reduce a possibility of loss of particular data considered to be important by the user of the imaging apparatus 101, by storing the particular data in the backup storage unit 104, and controlling supply of drive power to the backup storage unit 104 in such a manner that the drive power is supplied to the backup storage unit 104 in a backup mode, but is not supplied to the backup storage unit 104 in a normal mode.

Another aspect of the present invention is to design the imaging apparatus 101 such that the imaging apparatus 101 can automatically determine particular data, which is considered to be important by the user of the imaging apparatus 101, even when there is no command signal entered by the user of the imaging apparatus 101.

For example, as shown in FIG. 2, the method for setting backup data to be stored in the backup storage unit 104 may be carried out in a manual mode or in an automatic mode.

The user of the imaging apparatus 101 can select a desired mode via the user input unit 110 while viewing a menu picture as shown in FIG. 2.

Of course, the imaging apparatus 101 may be designed such that only one of the manual mode and automatic mode is set, without display of the menu picture as shown in FIG. 2, for more rapid processing.

Taking into consideration the convenience of users and diverse tastes of users, it is preferred that the imaging apparatus 101 be designed to enable users to select one of the manual mode and automatic mode for setting of backup data, as shown in FIG. 2.

If the user of the imaging apparatus 101 selects the manual mode via the user input unit 110, the main controller 109 controls the image signal processor 108 to display the menu picture shown in FIG. 3.

In this case, a list of A/V data stored in the memory card 102 and main storage unit 103 is displayed, as shown in FIG. 3.

The user of the imaging apparatus 101 can select backup data, to be stored in the backup storage unit 104, via the user input unit 110 while viewing the displayed A/V data.

For example, when the user of the imaging apparatus 101 selects data "Sports 2" as backup data to be stored in the backup storage unit 104, the main controller 109 backs up, in the backup storage unit 104, the data "Sports 2" stored in the main storage unit 103.

On the other hand, if the user of the imaging apparatus 101 selects the automatic mode via the user input unit 110, the main controller 109 automatically extracts particular data considered to be important by the user, based on a predetermined reference.

The automatic extraction of the particular data considered to be important by the user of the imaging apparatus 101 may be achieved using various methods.

In accordance with a first method, the main controller 109 can determine whether or not the particular data is important data, based on the period of time for which the data has been stored in the main storage unit 103.

This method uses the fact that the data which has been stored in the main storage unit 103 for a longer period of time has a possibility that the user considers the data to be more important.

For example, the main controller 109 may store information about the point of time when particular data is initially stored in the main storage unit 103, and may determine the particular data to be backup data when a predetermined storage period, for example, about one month, elapses for the particular data.

In accordance with a second method, the main controller 109 can determine whether or not the particular data is important data, based on the number of times at which the particular data is output through a display or speaker.

This method uses the fact that the data which has a larger number of access times has a possibility that the user considers the data to be more important.

For example, when the number of times at which particular data was output through the screen of the imaging apparatus 101 exceeds a predetermined value, for example, 10, the main controller 109 may determine the particular data to be backup data.

The main controller 109 may be set to store the particular data in the backup storage unit 104 immediately after automatically determining whether or not the particular data is important data (backup data). However, it may also be possible to allow the user to determine whether or not particular data automatically determined as important data is to be stored in the backup storage unit 104. To this end, the main controller 109 may be designed to be set in one of the above-descried two modes, namely, the mode "immediately store" and the mode "identify automatically-retrieved backup data, and determine whether or not backup data is to be stored", as shown in FIG. 4A.

The menu pictures shown in FIGS. 4A and 4B are provided to take into consideration the fact that the user may not desire to store the automatically-retrieved backup data in the backup storage unit 104.

When the user of the imaging apparatus 101 sets the mode "identify automatically-retrieved backup data, and determine whether or not backup data is to be stored", the menu picture shown in FIG. 4B is displayed.

In this case, accordingly, the user of the imaging apparatus 101 can identify information about the automatically-retrieved backup data (for example, "Sports 2"), and can determine whether or not the automatically-retrieved backup data is to be stored. Thus, it is possible to store backup data in the backup storage unit 104, if the user desires to store the backup data.

Figure 5:
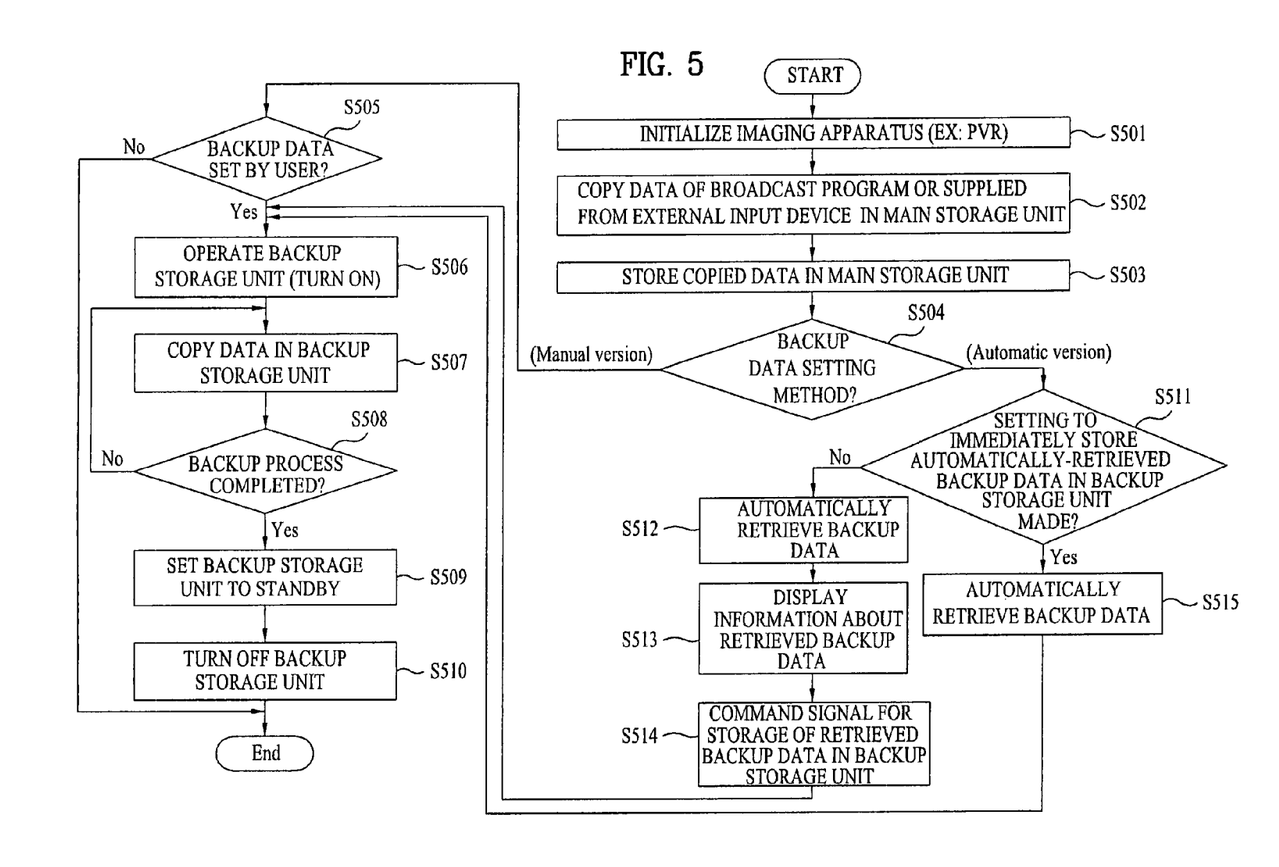
FIG. 5 is a flow chart illustrating an example of a method for controlling the imaging apparatus having an automatic backup function in accordance with the present invention.

FIG. 5 is a flow chart illustrating an example of a method for controlling the imaging apparatus having an automatic backup function in accordance with the present invention.

Hereinafter, the control method will be described in the order of a time sequence with reference to FIG. 5, together with FIGS. 1 to 4B.

In accordance with the control method, a task for initializing the imaging apparatus 101 is executed (S501). In this case, the imaging apparatus 101 may be, for example, a PVR.

A/V data transmitted to the imaging apparatus 101 as a broadcast signal, or A/V data applied to the imaging apparatus 101 from an external input device is copied in the main storage unit 103 of the imaging apparatus 101 (S502).

The A/V data may be data containing both audio data and video date, or data containing audio data or video data alone.

The copied data is stored in the main storage unit 103 (S503).

The method for determining backup data considered to be important by the user from the data stored in the main storage unit 103 is determined (S504). For this determination, the menu picture of FIG. 2 may be displayed.

When it is determined, based on the result of the determination (S504), that the method for determining the backup data considered to be important by the user is a manual mode, it is determined whether or not there is particular data set as backup data by the user (S505).

When it is determined, based on the result of the determination (S505), that there is particular data set as backup data by the user, the power supply unit 106 supplies drive power to the backup storage unit 104 (S506).

The main controller 109 then copies the particular data set as the backup data in the backup storage unit 104 (S507). Thus, the particular data is backed up in the backup storage unit 104.

Thereafter, the main controller 109 determines whether or not the backup process has been completed (S508).

When it is determined, based on the result of the determination (S508), that the backup process has been completed, the backup storage unit 104 is set to standby (S509).

The backup storage unit 104 is then turned off (S510).

Thus, the backup storage unit 104 (for example, an HDD or the like) is designed such that no drive power is supplied to the backup storage unit 104 in a non-operation state of the backup storage unit 104, in order to maintain the backup storage unit 104 in a most stable state, differently from the main storage unit 103.

On the other hand, when it is determined, based on the result of the determination (S504), that the method for determining the backup data considered to be important by the user is an automatic mode, it is determined whether or not a setting has been made to immediately store the automatically-retrieved backup data in the backup storage unit 104 (S511).

In this case, the menu picture for setting whether or not the automatically-retrieved backup data has to be immediately stored in the backup storage unit 104 may be provided as shown in FIG. 4A.

When it is determined, based on the result of the determination (S511), that an automatic storage mode has been set to immediately store the automatically-retrieved backup data in the backup storage unit 104, the main controller 109 retrieves backup data in accordance with a predetermined reference (S515).

In this case, the predetermined reference may be the storage period of the backup data or the number of display times of the backup data. This has been described in detail hereinbefore.

Thereafter, steps S506, S507, S508, S509, and S510 are repeatedly executed.

On the other hand, when it is determined, based on the result of the determination (S511) that the automatic storage mode for immediately storing the automatically-retrieved backup data in the backup storage unit 104 has not been set, the main controller 109 retrieves backup data in accordance with a predetermined reference (S512).

When particular data is retrieved as backup data in a retrieving process (S512), information about the particular data retrieved as backup data is displayed (S513). For example, the menu picture shown in FIG. 4B may be displayed.

After identifying the information about the particular data retrieved as backup data, the user enters a command signal for storage of the particular data in the backup storage unit 104, via the user input unit 110 (S514).

Thereafter, steps S506, S507, S508, S509, and S510 are repeatedly executed.

Figure 6:
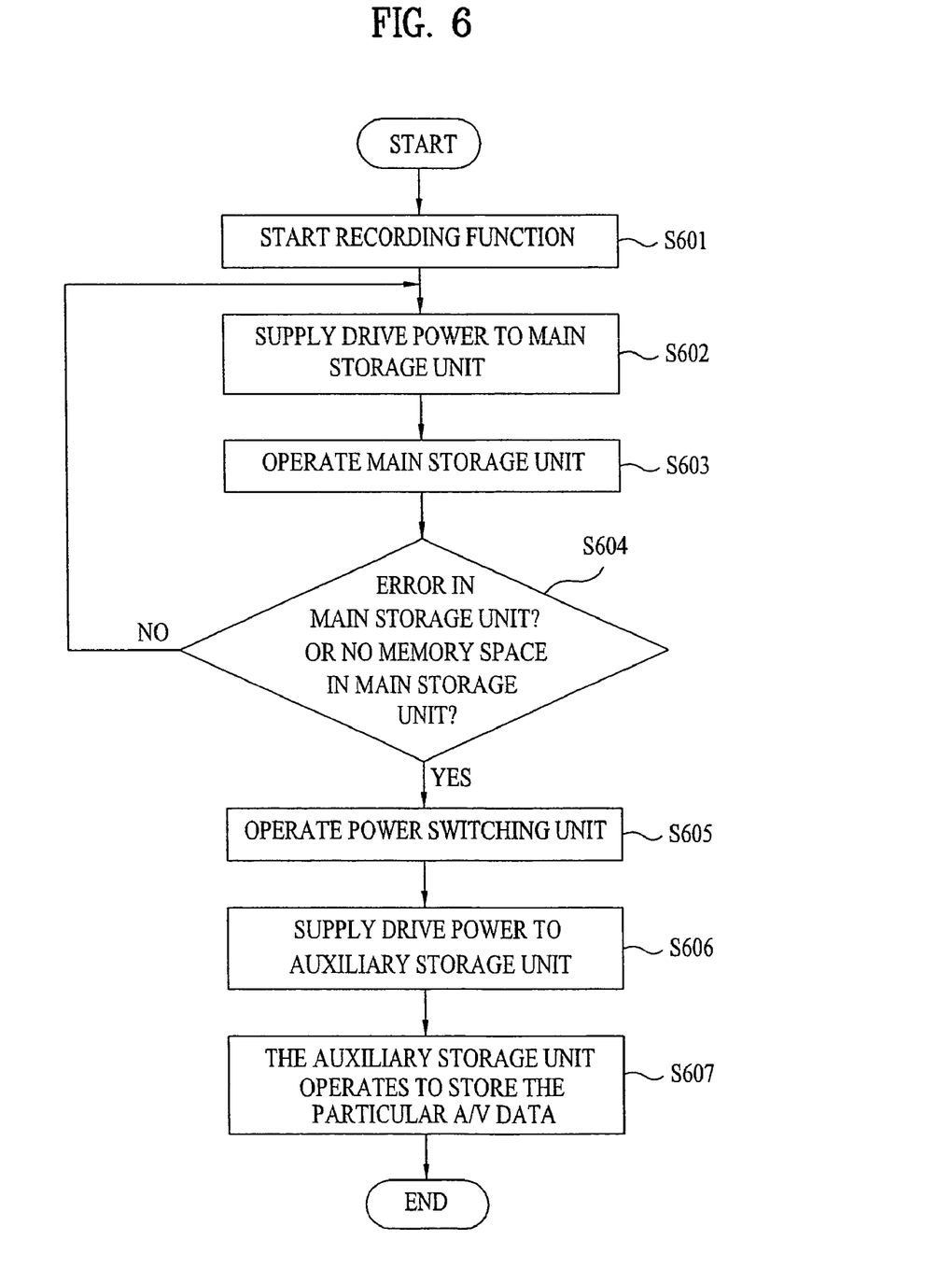
FIG. 6 is a flow chart illustrating another example of the method for controlling the imaging apparatus having an automatic backup function in accordance with the present invention.

FIG. 6 is a flow chart illustrating another example of the method for controlling the imaging apparatus having an automatic backup function in accordance with the present invention.

Hereinafter, the control method will be described in the order of a time sequence with reference to FIG. 6, together with FIG. 1.

In accordance with the control method, the imaging apparatus of the present invention starts a function for recording particular A/V data (S601).

Here, the imaging apparatus means an imaging apparatus for storing A/V data. For example, the imaging apparatus 101 may be a PVR.

Drive power is supplied to the main storage unit of the imaging apparatus (S602).

Accordingly, the main storage unit operates to execute a process for storing particular A/V data or the like (S603).

In this case, it is determined whether or not there is an error occurring in the main storage unit, or there is no memory space capable of sufficiently storing the particular A/V data (S604).

Here, the error of the main storage unit may be a hardware error in the supply of drive power to the main storage unit.

When it is determined, based on the result of the determination (S604), that there is no error occurring in the main storage unit, and there is a memory space capable of sufficiently storing the particular A/V data, the routine is repeatedly executed from step S602.

On the other hand, when it is determined, based on the result of the determination (S604), that there is an error occurring in the main storage unit, or there is no memory space capable of sufficiently storing the particular A/V data, the power switching unit is operated (S605).

In accordance with the operation of the power switching unit, the supply of drive power is switched from the main storage unit to the auxiliary storage unit.

That is, drive power is supplied to the auxiliary storage unit (S606).

As a result, the auxiliary storage unit operates to store the particular A/V data (S607).

As apparent from the above description, the imaging apparatus having an automatic backup function and the method for controlling the imaging apparatus in accordance with the present invention can provide an effect capable of more securely storing particular data desired by the user by backing up the particular data in a separate auxiliary storage unit.

Furthermore, the imaging apparatus can have a function for automatically determining particular data desired by the user, and storing the determined particular data in a memory in accordance the present invention. Accordingly, the present invention can provide an effect capable of maximizing the convenience of the user.

In addition, the present invention provides an advantage in that it is possible to completely securely record data desired by the user because desired A/V data can be stored in an auxiliary memory when a problem such as a hardware error or shortage of memory capacity occurs in the main memory.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling an imaging apparatus, comprising:

(a) storing data containing at least one of audio data or video data in a main storage unit, and determining whether or not the main storage unit has a memory space capable of storing the data;

(b) outputting information relating to the data stored in the main storage unit and determining backup data, to be stored in a backup storage unit, from the data stored in the main storage unit using the output information relating to the data;

(c) supplying drive power to the backup storage unit; and (d) copying the backup data, and storing the copied backup data in the backup storage unit when it is determined that the main storage unit does not have the memory space, wherein (a) further includes:
determining whether or not an error in a recording function of the main storage unit has occurred, and
storing the backup data, which contains at least one of audio data or video data, in the backup storage unit when it is determined that an error in the recording function of the main storage unit has occurred, wherein the error in the recording function of the main storage unit includes a hardware-related abnormal power supply state.

2. The method according to claim 1, wherein the backup storage unit includes at least one of a hard disk drive (HDD) or a memory card.

3. The method according to claim 1, wherein (b) includes:
displaying the information about the data stored in the main storage unit; and
allowing the user to select the backup data using the displayed information.

4. The method according to claim 1, wherein determining the backup data in (b) is made under a condition in which a predetermined time has elapsed from a point of time when the data was initially stored in the main storage unit.

5. The method according to claim 1, wherein determining the backup data in (b) is made under a condition in which a number of display times of the data exceeds a predetermined value.

6. The method according to claim 1, wherein the imaging apparatus is a personal video recorder (PVR).

7. The method according to claim 1, further comprising: cutting off the drive power supplied to the backup storage unit after completion of the copying in (d).

8. The method according to claim 7, further comprising:
setting the backup storage unit to standby before cutting off the drive power supplied to the backup storage unit.

9. The method according to claim 1, wherein the backup data is stored in a form of transport packets (TPs) in the backup storage unit in (d).

10. The method according to claim 1, wherein the data, which contains at least one of audio data or video data, includes at least one of broadcast data or external input data.

11. An imaging apparatus comprising:
a data receiver which receives data containing at least one of audio data or video data;
a main storage unit which stores data containing at least one of audio data or video data;
a display unit which displays guide information that indicates the data stored in the main storage unit; and
a controller which determines whether or not the main storage unit has a memory space capable of storing next data, determines whether or not an error in a recording function of the main storage unit has occurred, determines backup data from the data stored in the main storage unit using the guide information, copies the backup data according to at least one of the determinations about the memory space and error, and stores the copied backup data in a backup storage unit, wherein the error in the recording function of the main storage unit includes a hardware-related abnormal power supply state, and wherein the controller cuts off drive power supplied to the backup storage unit.

12. The imaging apparatus according to claim 11, wherein the backup storage unit includes at least one of a hard disk drive (HDD) and a memory card.

13. The imaging apparatus according to claim 11, further comprising: a power supply unit which supplies drive power to the backup storage unit when the backup storage unit is to operate to store the copied data.

14. The imaging apparatus according to claim 11, further comprising: a display unit which outputs information about the data stored in the main storage unit; and an input unit which enables a user to select backup data using the information output through the display unit.

15. The imaging apparatus according to claim 11, wherein the controller retrieves backup data from the backup data storage unit when a predetermined time has elapsed from a point of time when the data was initially stored in the main storage unit.

16. The imaging apparatus according to claim 11, wherein the controller retrieves backup data from the backup data storage unit when a number of display times of the data exceeds a predetermined value.

17. The imaging apparatus according to claim 11, wherein the imaging apparatus is a personal video recorder (PVR).

18. The imaging apparatus according to claim 11, wherein the backup storage unit stores the data determined as the backup data in a form of transport packets (TPs).

19. The imaging apparatus according to claim 11, wherein the data, which contains at least one of audio data or video data, includes at least one of broadcast data or external input data.

20. An imaging apparatus, comprising:
a data receiver which receives data containing at least one of audio data or video data;
a main storage unit which stores data containing at least one of audio data or video data;
a display unit which displays guide information indicating the data stored in the main storage unit; and
a controller which determines whether or not the main storage unit has a memory space capable of storing next data, determines whether or not an error in a recording function of the main storage unit has occurred, copies data stored in the main storage unit according to at least one of the determinations, and stores the copied data in a backup storage unit as backup data, wherein the error in the recording function of the main storage unit includes a hardware-related abnormal power supply state, and
wherein the controller determines the backup data from data stored in the main storage unit using the guide information relating to the data, copies data determined as backup data, stores the copied backup data in the backup storage unit, and sets the backup storage unit to standby, and wherein the controller cuts off drive power supplied to the backup storage unit.

* * * * *